(12) United States Patent
Araya

(10) Patent No.: US 7,506,183 B2
(45) Date of Patent: Mar. 17, 2009

(54) DATA AUTHENTICATION CIRCUIT, BATTERY PACK AND PORTABLE ELECTRONIC DEVICE

(75) Inventor: Azuma Araya, Kawasaki (JP)

(73) Assignee: NEC Electronics Corporation, Kanagawa (JP)

(*) Notice: Subject to any disclaimer, the term of this patent is extended or adjusted under 35 U.S.C. 154(b) by 481 days.

(21) Appl. No.: 11/283,761

(22) Filed: Nov. 22, 2005

(65) Prior Publication Data
US 2006/0108972 A1    May 25, 2006

(30) Foreign Application Priority Data
Nov. 25, 2004    (JP) ............................. 2004-340482

(51) Int. Cl.
*G06F 1/00* (2006.01)
*H04L 9/00* (2006.01)

(52) U.S. Cl. .................. 713/300; 713/159; 713/168

(58) Field of Classification Search .................. 713/300
See application file for complete search history.

(56) References Cited

U.S. PATENT DOCUMENTS 5,761,309 A * 6/1998 Ohashi et al. ............... 713/156
7,250,612 B2 * 7/2007 Pai-Paranjape et al. ... 250/461.1
2001/0052075 A1 * 12/2001 Feinberg ....................... 713/168
2003/0101378 A1 * 5/2003 Ohkubo ......................... 714/37
2003/0105960 A1 * 6/2003 Takatori et al. ............. 713/168

FOREIGN PATENT DOCUMENTS

JP    2003-162986    6/2003

* cited by examiner

*Primary Examiner*—Suresh K Suryawanshi
(74) *Attorney, Agent, or Firm*—Young & Thompson

(57) ABSTRACT

Suppression malfunction of an authentication circuit for authenticating a battery pack. Signal line for applying an intermediate potential between the power supply and ground and for reading the potential of a thermistor for detecting the temperature is used as a transmission path for exchanging data between a battery pack and main device. A master-authentication circuit and slave-authentication circuit comprise level-correction circuits, which are connected to the signal line by way of a voltage-comparator circuit. The level-correction circuits are constructed such that they correct the signal applied to the signal line so that it is greater than or less than the unstable-region voltage, and outputs it to the input end of the authentication circuits, so that unstable-region voltage is not applied to the input end. Output circuits overlap in turn authentication information onto the signal line when performing authentication, and the level-correction circuits receive the respective information, and authentication is performed.

20 Claims, 7 Drawing Sheets

DATA AUTHENTICATION CIRCUIT, BATTERY PACK AND PORTABLE ELECTRONIC DEVICE

FIELD OF THE INVENTION

This invention relates to a data-authentication circuit, battery pack and portable electronic device, and more particularly to a battery pack and portable electronic device having a temperature-detection function and authentication function, and the data-authentication circuit used therein.

BACKGROUND OF THE INVENTION

A portable electronic device such as a cellular phone generally uses a battery pack in which a battery that supplies power to the unit is mounted. When the battery does not function sufficiently even though the battery has been charged, it is possible to replace the battery pack in order to continue using the electronic device. Here, a typical battery pack uses a rechargeable secondary battery such as a Lithium-ion battery as the battery and integrates it with an overcharge-prevention circuit or over-discharge-prevention circuit. When the remaining amount of time that this kind of secondary battery can be used becomes short (or in other words, when the battery life becomes short), or when it become impossible to charge the battery to a specified voltage, or when due to some kind of trouble the battery is not able to supply a specified amount of power to the device, the battery pack is replaced with a different battery pack, which is mounted and used in the device.

While charging the battery, the battery pack become hot, so in order that the battery pack does not exceed a specified temperature, the temperature of the battery pack may be monitored from the side of the electronic device. In other words, when charging the battery by supplying power to the battery from the power supply that is connected to the electronic device, output data from a temperature-detection sensor that is contained inside the battery pack near the battery is monitored, and when the temperature exceeds a preset specified temperature, charging stops, and an alarm is displayed. Also, during use as well, abnormalities that may occur in the battery, and the temperature of the battery pack may be monitored periodically. In this case, a terminal for obtaining the output data related to the temperature from the battery pack is necessary, and it can be located on the battery pack or on the electronic device.

Also, technology is known by which the battery pack is authenticated in order to identify whether or not the battery pack is a proper battery pack. In other words, both the battery pack and the electronic device store an ID (identifier), and when connected, the battery pack is authenticated as to whether it is a proper battery pack by comparing the ID output from the battery pack with the ID stored in the device. Recently, due to counterfeit and imitation battery pack parts, there is a possibility that problems such as abnormal heat, leakage, cracking or the like may occur. Therefore, in addition to having a temperature detection function, it is desirable that the battery pack have a authentication function.

When obtaining this kind of ID signal, it is generally necessary to have a new terminal or signal line. In that case, the number of parts increases or the mounting area is enlarged. Therefore, a device is known that is constructed such that the data-transmission signal for authentication when authenticating the battery pack, and the signal from the temperature-detection sensor are sent on one signal line in order to suppress the increase in the number of parts and enlargement of the mounting area. (For example, see patent document 1.)

FIG. 7 is a block diagram showing the construction for sharing the transmission line of the temperature-detection sensor in the data-transmission circuit of a conventional device, and the communication line of a clock. In FIG. 7, when measuring the resistance of the thermistor (temperature-detection sensor) TH, the transistor T is ON, and the divided voltage of the resistance R and the thermistor TH with respect to the power supply V is applied to the communication line. The value of a divided voltage is input to buffer B1, and the temperature is detected by reading the value by a circuit (not shown in the figure) on the side of the electronic device. On the other hand, when performing authentication, the transistor on the side of the device is OFF, and the enable signal E1 is activated. Also, a clock CLK is sent from a buffer TB to a buffer B2 on the side of the battery. By doing this, it is possible for the transmission signal of the clock during authentication and the signal from the temperature-detection sensor to share one signal line.

[Patent Document 1] Japanese Patent Kokai Publication No. JP-P2003-162986A (FIG. 6)

SUMMARY OF THE DISCLOSURE

In the circuit shown in FIG. 7, when measuring the resistance of the thermistor, the transistor T goes ON, so the divided voltage of the resistance R and the thermistor TH with respect to the power supply V is applied to the communication line (signal line). At this time, an intermediate voltage between the power supply and the ground, or in other words, the voltage obtained by multiplying the voltage (the voltage between the power supply V and ground) with the fraction comprising the numerator THR and denominator that is the sum of the value of the resistance R and the value of the resistance set from the temperature of the thermistor at that time (hereafter referred to as THR), is applied to the input of the buffers B1, B2 of the authentication circuit. Due to the value of this intermediate voltage, there is a possibility that the output of the buffer B2 could become unstable and could cause the authentication circuit to malfunction. In this disclosure, the input voltage or input potential that could make the value of the input buffer become unstable is hereafter referred to as the 'unstable-region voltage' or 'unstable-region potential'.

Typically, detecting the thermistor TH temperature is performed by converting an analog divided voltage value to a digital value by an A-D converter. In this kind of case, in order to improve the precision of the temperature detection, by making the resistance value THR of the thermistor at the average temperature during normal use of the battery pack be about the same as the value of the resistance R, and by making the reference value of fluctuation of the divided voltage be about ½ the power-supply voltage V, the area in which the width of the temperature fluctuation can be observed is increased, and thus it is possible to more precisely measure the temperature; which is desirable. In this case, naturally, the value of the divided voltage becomes about ½ the power-supply voltage V. Therefore, it is easy for the input of the aforementioned buffers B1, B2 to become a voltage of an unstable-range. When an unstable-range voltage is added, the output of the buffers B1, B2 becomes unstable, and this will possibly have bad effects on the authentication circuit in a latter stage and could cause it to malfunction. Typically, the buffer is constructed using a CMOS circuit. Normally, most CMOS buffers identify an input voltage that is approximately 70 to 80% or more the power-supply voltage as being high level, and identify an input voltage that is 10 to 20% or less the power-supply voltage as being low level. In this disclosure, high level is when the input voltage is such that the output is high level, and low level is when the input voltage is such that the output is low level. Therefore, the range in which the input voltage exceeds 20% and is less than 70% the power-supply voltage is often an unstable region in which it is not possible to assure whether or not the level will be high or low. This unstable region is a concrete example of the unstable-region voltage referred to in this disclosure. Also, when an unstable-region voltage is applied, and current is passing through the CMPS circuit, normally, temperature measurement is performed periodically, so the chance of having a bad effect on the authentication circuit increases even more.

In order to solve the problems mentioned above, a level-correction circuit is placed between the input terminal and authentication circuit, and by using this level-correction circuit, unstable-region voltage is unable to reach the authentication circuit.

According to one aspect of the invention, there is provided a data-authentication circuit. The data-authentication circuit comprises: an input/output terminal; a temperature sensor of which one terminal is connected to the input/output terminal and the other terminal is connected to a reference power supply; a level-correction circuit whose input end is connected to the input/output terminal, and whose output end is connected to the input end of a authentication circuit; and a authentication circuit that outputs a signal related to authentication to the input/output terminal. The level-correction circuit corrects the voltage applied to the input/output terminal so as to make the voltage greater than or less than an unstable-region voltage, and outputs the resultant voltage to the authentication circuit.

The meritorious effects of the present invention are summarized as follows.

With this invention, construction is such that by using the level-correction circuit, unstable-region voltage that would cause the output of the input buffer to become unstable is not applied to the authentication circuit, so it is possible to keep adverse effects to the authentication circuit, malfunction of the authentication circuit, abnormal consumption of the battery, and the like to a minimum.

PREFERRED EMBODIMENTS OF THE INVENTION

Figure 1:
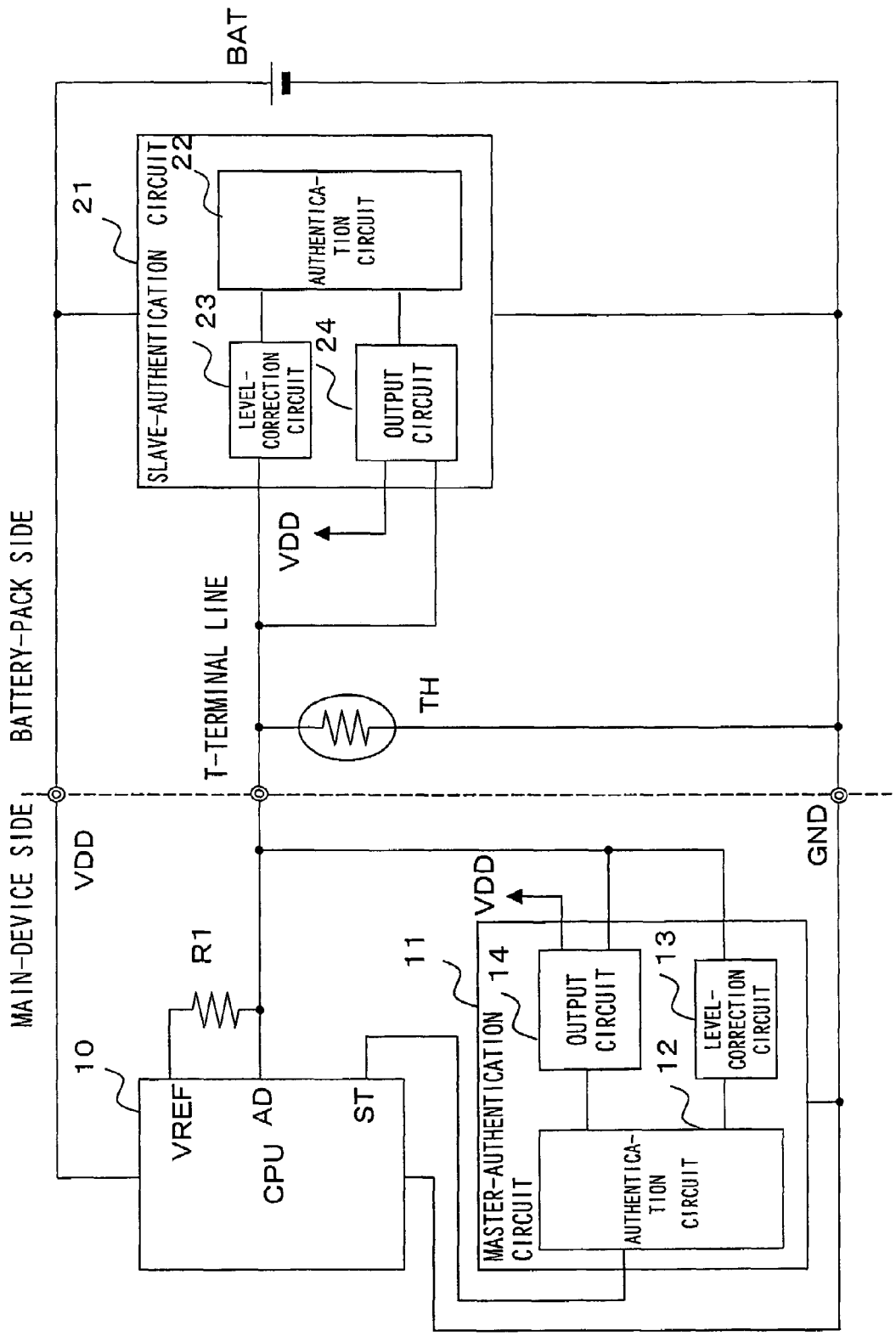
FIG. 1 is a block diagram showing the construction of a battery pack and portable electronic device of a first embodiment of the invention.

The data-authentication circuit of this invention is used in a slave authentication circuit (21 in FIG. 1) that is located between a battery pack and portable electronic device in which the battery pack is mounted (the main device) and is used for performing authentication of the properness of the battery pack. A signal line (T-terminal line in FIG. 1) for reading the potential of a temperature sensor that applies a potential that is between the power-supply potential and ground potential and detects the temperature is also used as the transmission path for transmitting data between the battery pack and the device. The data-authentication circuit has level-correction circuits (13, 23 in FIG. 1) that are connected to the signal line by way of a voltage-comparator circuit, and is constructed such that no unstable-region voltage is applied to the input terminal of the authentication circuit, and it overlaps the authentication information on the communication line.

Also, the portable electronic device of the embodiments of the invention further has a master-authentication circuit on the device side as a authentication circuit that corresponds to the slave-authentication circuit on the side of the battery pack. The master-authentication circuit (11 in FIG. 1) has a level-correction circuit (13 in FIG. 1), and similar to the slave side, it is constructed such that no unstable-region voltage is applied to the input terminal of the authentication circuit (12 in FIG. 1), and it overlaps the authentication information onto the communication line. The preferred embodiments of the invention will be explained in detail below with reference to the drawings.

Embodiment 1

FIG. 1 is a block diagram showing the construction of the battery pack and portable electronic device of a first embodiment of the invention. In FIG. 1 the portable electronic device (main device) comprises a CPU 10, master-authentication circuit 11 and resistor R1. On the other hand, the battery pack comprises a slave-authentication circuit 21, thermistor TH and battery BAT. The portable electronic device is a device such as a portable telephone or portable information terminal (including combined-type information terminal having a digital still camera function, digital video camera function or the like), and the main device side has various circuits enabling the function of the portable electronic device, however, since they are not related to the present invention, the explanation of them will be omitted. Also, the battery pack side, in addition to the aforementioned slave-authentication circuit 21, thermistor TH and battery BAT also has additional circuits and devices for charging and supplying power between the battery pack and the main device, however, since they are not related to the present invention, the detailed explanation thereof will be omitted.

As shown in FIG. 1, the power-supply voltage VDD of the battery is supplied from the battery BAT to the electronic circuits and electronic elements on the main device side and battery pack side. Also, when necessary the battery supplies increased voltage or decreased voltage to these circuit elements, however, an explanation of areas that are not directly related to the operation of this invention will be omitted. For example, the power-supply voltage VDD of the battery BAT may be about 4V. Of course, this value is just an example, and in this invention, various values are possible.

In the portable electronic device (main device side), the CPU 10 supplies a voltage from the terminal VREF to the thermistor TH by way of the resistor R1 in order to perform temperature detection. The point of connection between the resistor R1 and thermistor TH (T-terminal line) is connected to the terminal AD of the CPU 10. The CPU 10 calculates the temperature of the thermistor TH by reading the voltage at the terminal AD. The CPU 10 contains a temperature-analysis function for controlling the portable electronic device based on the calculation results. A thermistor having various resistance temperature characteristics can be used for the thermistor TH. For example, a thermistor can be used that has resistance-temperature characteristics such as a resistance value between several KΩ to several tens KΩ at room temperature of 25° C., a resistance value of several tens times that at room temperature at a low temperature of −40° C., and a resistance value of several times to several tens times that at room temperature at a high temperature of 75° C.

Also, by way of the terminal ST, the CPU 10 exchanges necessary data with the master-authentication circuit 11 in order to perform authentication of the battery pack, and controls the portable electronic device according to the authentication results obtained from the master-authentication circuit 11. The CPU 10 and master-authentication circuit 11 can be connected by way of a serial or parallel communication line, for example, such that they are in a state in which bi-directional data communication is possible.

The master-authentication circuit 11 comprises: a authentication circuit 12, level-correction circuit 13 and output circuit 14. The authentication circuit 12 has a authentication function, and it exchanges control information with the CPU 10 that is related to authentication. The input of the level-correction circuit 13 is connected to the T-terminal line, and it receives data sent from the battery-pack side related to authentication such as the battery-pack ID information, and outputs it to the authentication circuit 12. The output of the output circuit 14 is connected to the T-terminal line, and it sends data that is output from the authentication circuit 12 related to authentication, such as a transmission request for ID information, to the battery-pack side.

On the battery pack side, the slave-authentication circuit 21 comprises: a authentication circuit 22, level-correction circuit 23 and output circuit 24. The slave-authentication circuit 21 has a authentication function, and by way of the output circuit 24, it sends data to the portable electronic device (main device side) in response to data sent from the portable electronic device (main device side) that is related to authentication, for example, battery-pack ID information and the like. The input of the level-correction circuit 23 is connected to the T-terminal line, and it receives data sent from the portable electronic device (main device side) related to authentication, and outputs it to the authentication circuit 22. The output of the output circuit 24 is connected to the T-terminal line, and it sends data that is output from the authentication circuit 22 and that is related to authentication to the portable electronic device (main device side).

Also, the battery-pack side has a thermistor TH for monitoring the temperature around the battery, and one end of the thermistor TH is connected to the T-terminal line, and the other end is connected to ground.

The battery pack side and the portable electronic device (main device side) are constructed as described above such that the AD terminal of the CPU 10, one end of the resistor R1, the input end of the level-correction circuit 13, the output end of the output circuit 14, one end of the thermistor TH, the input end of the level-correction circuit 23 and the output end of the output circuit 24 are all connected in common to the T-terminal line. The CPU 10 reads the potential of the thermistor TH by way of the T-terminal line. Also, by way of the T-terminal line, the output circuit 14 sends a data signal to the level-correction circuit 23, and the output circuit 24 sends a data signal to the level-correction circuit 13. The master-authentication circuit 11 and slave-authentication circuit 21 are connected to one communication line (T-terminal line) in this way, and they are capable of bi-directional communication. The output terminals of both the master-authentication circuit 11 and slave-authentication circuit 21 are constructed such that signals from the power supply overlap on the line (T-terminal line) that is connected to the thermistor TH for monitoring the temperature around the battery, and necessary signals from inside the authentication circuit are controlled such that they overlap.

The CPU 10 determines when to start measuring the voltage of the thermistor TH for detecting the temperature around the battery, and calculates the temperature of the thermistor TH from the terminal-voltage information from the thermistor TH, and has a built-in temperature-judgment function that controls the portable electronic device based on the calculation results. Also, the CPU 10 exchanges necessary data with the master-authentication circuit 11 in order to perform authentication of the battery, and controls the portable electronic device according to the authentication results. For example, it can be such that it displays to the user whether or not the mounted battery pack is a proper battery pack or not.

Figure 2:
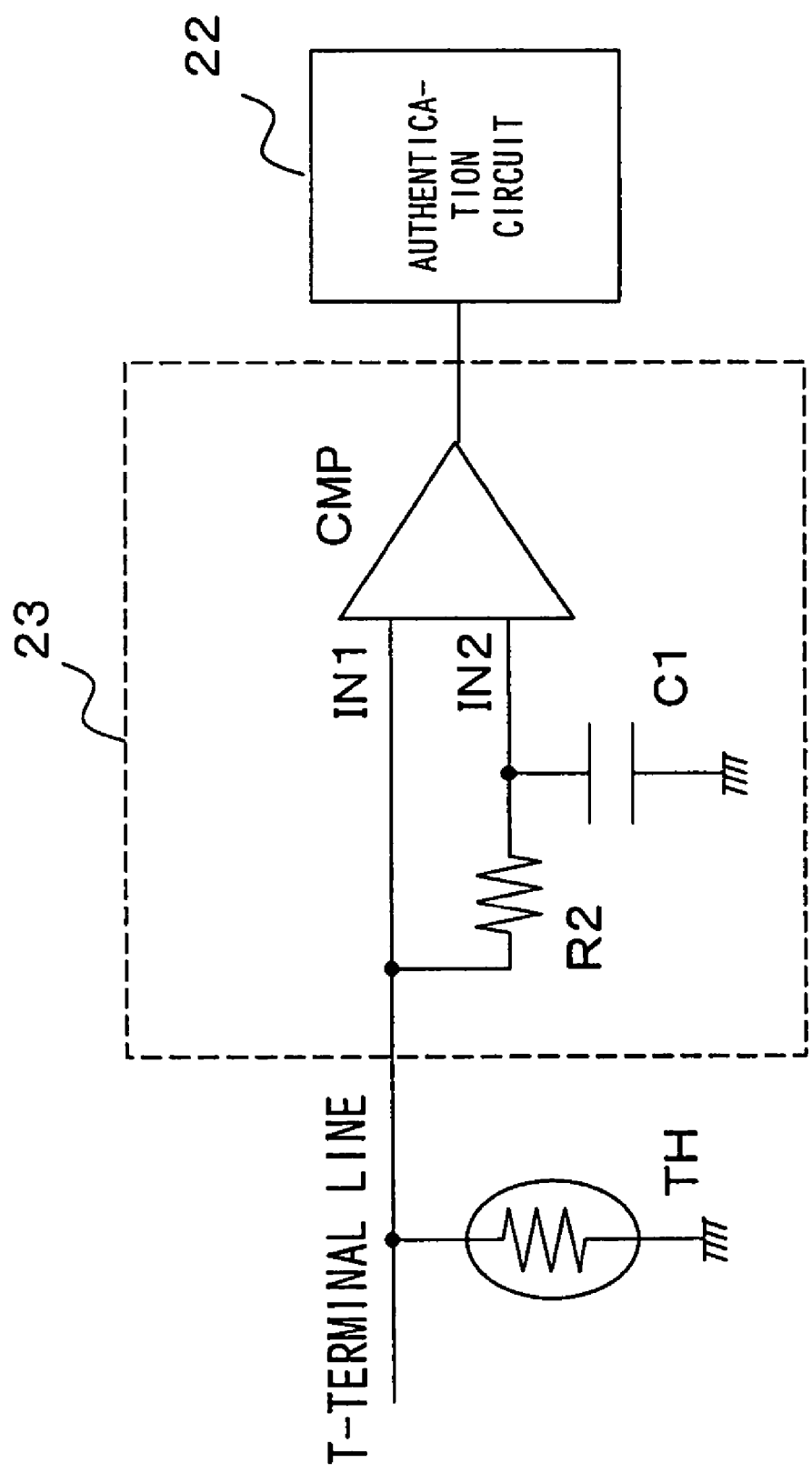
FIG. 2 is a block diagram showing the construction of the level-correction circuit of a first embodiment of the invention.

Next, the level-correction circuits 13, 23 will be explained. FIG. 2 is a block diagram showing the construction of the level-correction circuits of this first embodiment of the invention. The level-correction circuits 13, 23 have the same construction, so here the level-correction circuit 23 will be explained. The level-correction circuit 23 comprises: a resistor R2, capacitor C1 and comparator CMP. An input terminal IN1 of the comparator CMP is connected to one end of the T-terminal line to which the thermistor TH is connected, and to one end of the resistor R2. An input terminal IN2 of the comparator CMP is connected to the other end of the resistor R2 and to one end of the capacitor C1, and the other end of the capacitor C1 is connected to ground. The output of the comparator CMP is connected to the authentication circuit 22. The resistor R2 and capacitor C1 form an integrator, and the comparator CMP compares the signal level of the T-terminal line (level of the input terminal IN1) with an integrated level of this signal (level of the input terminal IN2), and outputs the comparison results to the authentication circuit 22 as serial-logic data.

Here, the comparator CMP amplifies the level difference, so when there is a difference in potential between the level of the input terminal IN1 and the level of the input terminal IN2, the output is output as a either a value near the power-supply voltage or a value near the ground potential. In other words, the output is output as either a high-level value or a low-level value, and an unstable-region voltage is not output. As in the case of temperature measurement, there is a problem when the input terminal IN1 and the input terminal IN2 are at the same potential, however, the comparator of this embodiment has an offset-voltage characteristic that will be described later, so even in this case, an unstable-region voltage will not be output. Therefore, even when taking the value of the offset voltage into account, an offset-voltage value is selected such that a level difference exists.

Figure 3:
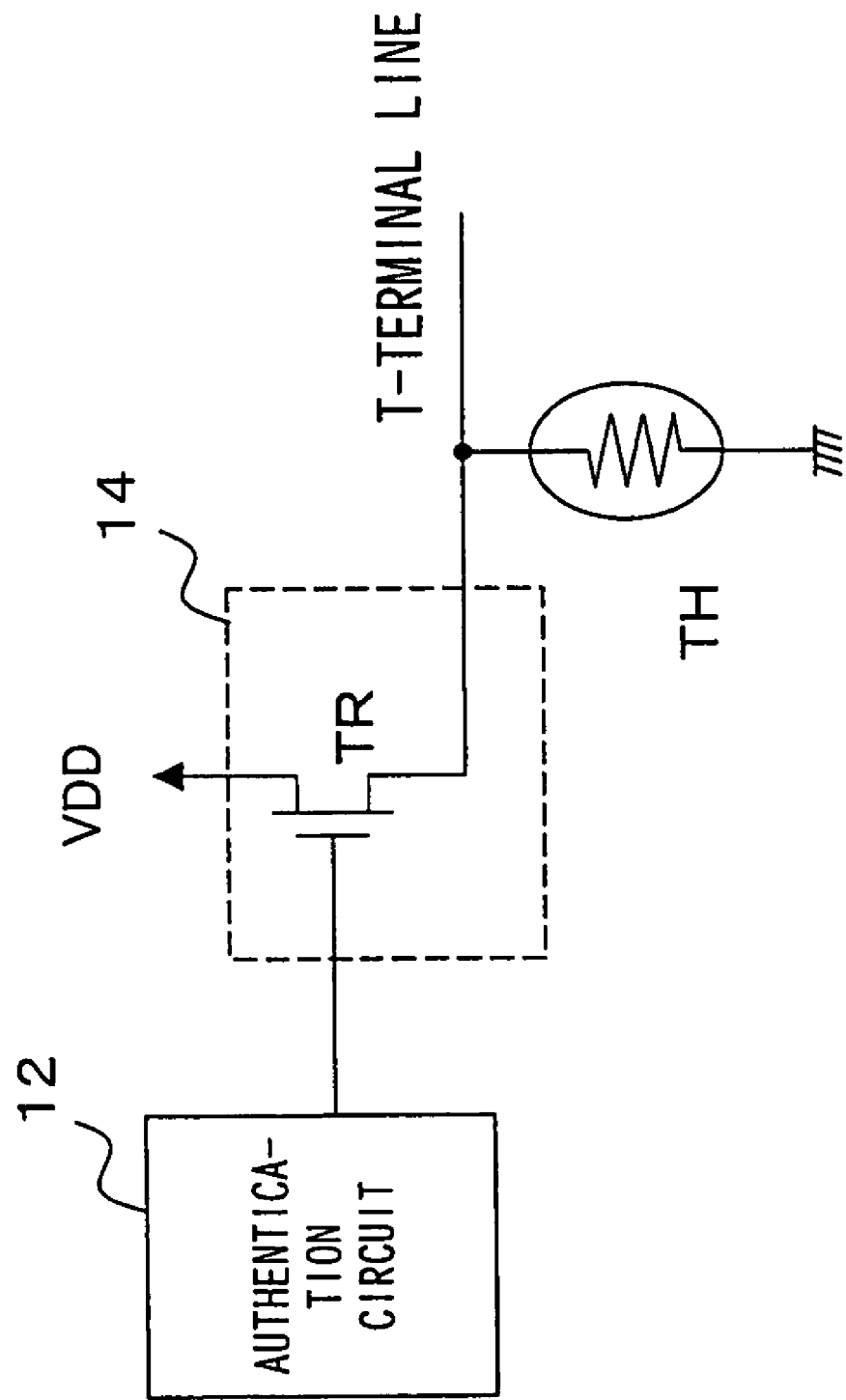
FIG. 3 is a block diagram showing the construction of the output circuit of a first embodiment of the invention.

Next, the output circuits 14, 24 will be explained. FIG. 3 is a block diagram showing the construction of the output circuit of this first embodiment of the invention. The output circuits 14, 24 have the same construction, so the output circuit 14 will be explained here. The output circuit comprises a field-effect transistor TR. The field-effect transistor TR operates so that it is turned ON or OFF according to two-value signal output from the authentication circuit 12. When it is ON, it supplies the power-supply voltage VDD to the T-terminal line, and when it is OFF, it does not affect the T-terminal line. (In other words, it maintains the potential for measuring the temperature of the thermistor TH. The reason for this is that the resistor R1 is always connected and the power-supply voltage VDD is applied to a terminal VREF, and when seen from the T-terminal line, the comparator CMP that is connected to the T-terminal line has high impedance.) By turning ON/OFF the field-effect transistor TR, the output circuit 14 outputs serial-logic data to the T-terminal line. When authentication is not performed, that is, when the field-effect transistor TR is fixed in the OFF state, there is high impedance as seen from the T-terminal line, and the temperature measurement is not affected.

Figure 4:
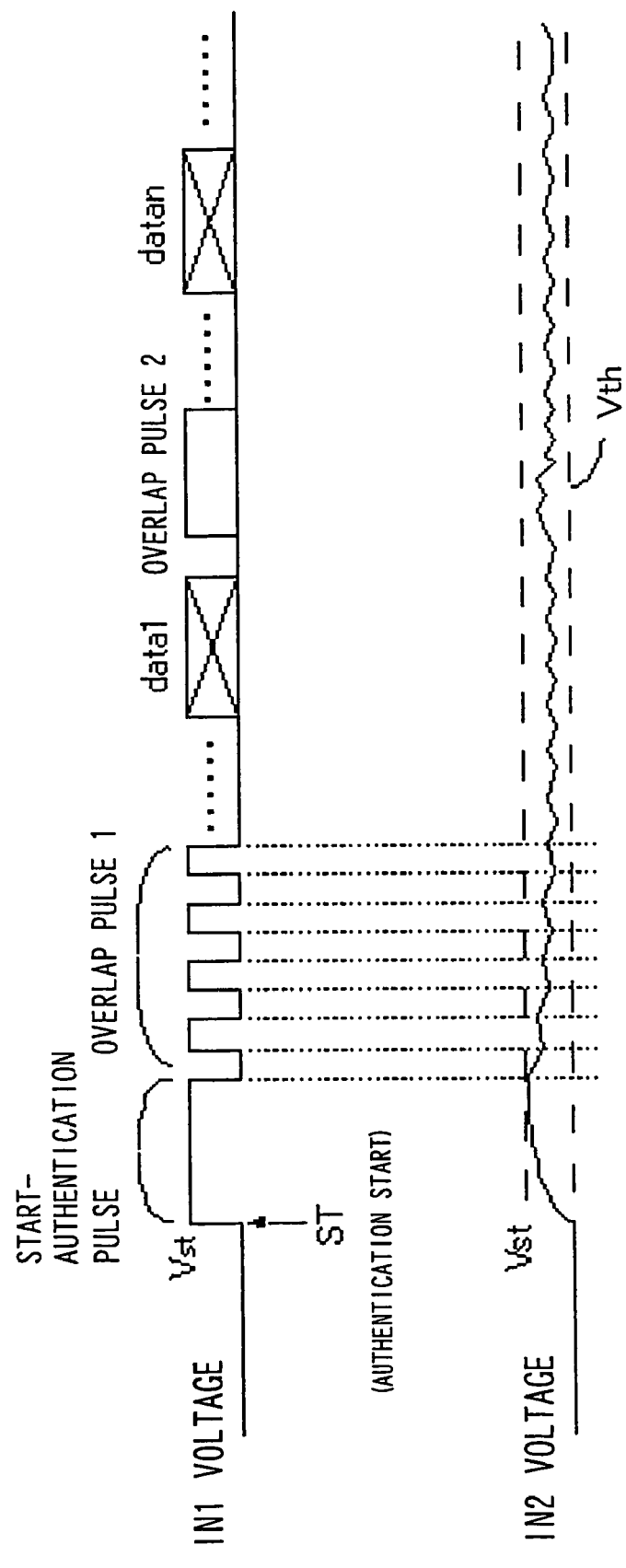
FIG. 4 is a drawing showing the signal waveform of the T-terminal line and signal waveform of the converter terminal IN2 during authentication.

Next, the operation on the main-device side and the battery-pack side will be explained. FIG. 4 is a drawing showing the signal waveform of the T-terminal line (terminal IN1 of the comparator CMP inside the level-correction circuit 23) and the signal waveform of the terminal IN2 of the comparator CMP inside the level-correction circuit 23 during authentication.

First, the slave-authentication circuit 21 on the side of the battery pack is normally in a state such that power consumption is suppressed in the low-power-consumption mode.

During authentication, the master-authentication circuit 11 on the main-device side receives a command that is sent from the terminal ST of the CPU 10 to start and returns to the normal mode, then sends a start-authentication pulse to the T-terminal line. At this time, the voltage of the input terminal IN1 of the comparator of the level-correction circuit rises to a voltage Vst that is near the operating voltage VDD of the master-authentication circuit 11. On the other hand, before sending the authentication pulse, the voltage of the input terminal IN2 of the comparator is the same as the voltage of the input terminal IN1, and in this embodiment, for example, at room temperature, the resistance value of the thermistor and the value of the fixed resistance R1 are set to about the same value, so the voltage of the input terminal IN2 is about ½ VDD. Also, when the start-authentication pulse is sent, the voltage of the input terminal IN2 rises, however, due to the resistor R2 of the integrator circuit and the time constant of the capacitor C1, the rise in voltage is slower than that of the input terminal IN1.

In the comparator CMP, the voltage at the input terminal IN1 is higher by the amount that the rise in voltage at input terminal IN2 is delayed, so a voltage difference occurs between the input terminal IN1 and input terminal IN2. A fixed output value is sent to the data-input section of the authentication circuit 22 for serial-logic data according to this voltage difference, and the slave-authentication circuit 21 returns from the low-power-consumption mode to the normal mode.

Next, when sending authentication information from the master-authentication circuit 11, an overlap pulse (overlap pulse 1) is output. This overlap pulse is a square wave having a duty ratio of about 50%, and it is integrated by the integrator circuit (R2, C1). After the start-authentication pulse has been output, the voltage at the input terminal IN2 of the comparator rises until it reaches near Vst, however, by outputting the overlap pulse, due to the operation of the integrator circuit, it lowers to become steady near an intermediate value between Vth and Vst.

On the other hand, the voltage at the input terminal IN1 is Vst or Vth, so the output becomes either near the power-supply voltage (high level) or the ground potential (low level), and output of unstable-region voltage does not occur. Also, even when authentication related information data1 is overlapped on the T-terminal line, as can be seen in FIG. 4, the voltage at the input terminal IN1 of the overlapped signal is Vst or Vth, and since the voltage at the input terminal IN2 is a value nearly mid between that, the output becomes either near the power-supply voltage (high level) or the ground potential (low level), and output of unstable-region voltage does not occur. Therefore, it is possible to send necessary information to the authentication circuit 22. When doing this, it is preferred that the overlap pulse for integration be sent periodically in a cycle such that the overlap-signal-judgment voltage does not change from the stable receiving level. Also, it is preferred that the value of the offset voltage of the comparator CMP be determined by taking into account the value Vst or Vth.

Next, by similarly overlapping on the T-terminal line, authentication-related information is returned from the slave-authentication circuit 21 to the master-authentication circuit 11. The master-authentication circuit 11 determines whether or not to authenticate the battery pack according to the returned information, and sends the judgment results to the CPU 10.

After the authentication process ends, the master-authentication circuit 11 and slave-authentication circuit 21 automatically change to the low-power-consumption mode.

On the other hand, during the period when the authentication process described above is not performed, the temperature is measured. When measuring the temperature, the divided voltage (Vth) of the power-supply voltage VDD due to the thermistor TH and resistor R1 is input as an intermediate voltage to both of the level-correction circuits 13, 23. In this embodiment, as described above, since the resistance value of the thermistor at room temperature and the resistance value of the fixed resistance are made to be about the same, the intermediate voltage becomes approximately ½ VDD. At this time, the input terminal IN1 and the input terminal IN2 of the comparator inside the level-correction circuits 13, 23 are nearly the same potential, however, the comparator CMP is selected such that it applies a specified offset voltage between the input terminal IN1 and input terminal input IN2, so the output of the comparator CMP does not vary. The method for constructing the offset in this case can be selected properly according to the construction of the authentication circuit. After temperature measurement has ended and the authentication process begins, the signal overlapped with the signal for authentication is input to the comparator CMP of the level-correction circuits 13, 23 and the signal of the comparison results is input to the authentication circuits 12, 22.

When temperature measurement is performed, even though a high-level or low-level output signal maybe input at the input end of the authentication circuit, the authentication circuit will not function unless the start-authentication command has been received. Also, the field-effect transistors TR of the output circuits 14, 24 are OFF because the start-authentication command has not been received. Therefore, when seen from the T-terminal, there is high impedance and the temperature measurement is not affected. Moreover, adverse effects on the authentication circuits that occurred with the conventional art do not occur. Furthermore, making the resistance value of the thermistor at room temperature nearly the same as the resistance value of the resistance R is only one example, and there is freedom to make them the same value in a little higher temperature or lower temperature range.

By having the comparator CMP function as described above, unstable-region voltage that is unstable and between a two-value signal is not applied to the input of the authentication circuits 12, 22, and thus malfunction of the authentication circuit can be prevented. Also, since the authentication circuit does not function unnecessarily, consumed current is reduced.

In the explanation above, the potential (reference voltage) at the input terminal IN2 of the comparator CMP is generated using an integrator circuit, however, it is not necessary to use an integrator circuit. For example, the same effect can be obtained by generating the reference voltage from the battery on the battery-pack side by way of a power-supply circuit such as a regulator. Also, on the main-device side as well, the same effect can be obtained by using the voltage used inside the main device as the reference voltage. Needless to say, in this case, it is necessary to select an adequate reference voltage by taking into consideration the resistance-temperature characteristics of the thermistor TH used and the value of the fixed resistance R1.

Figure 5:
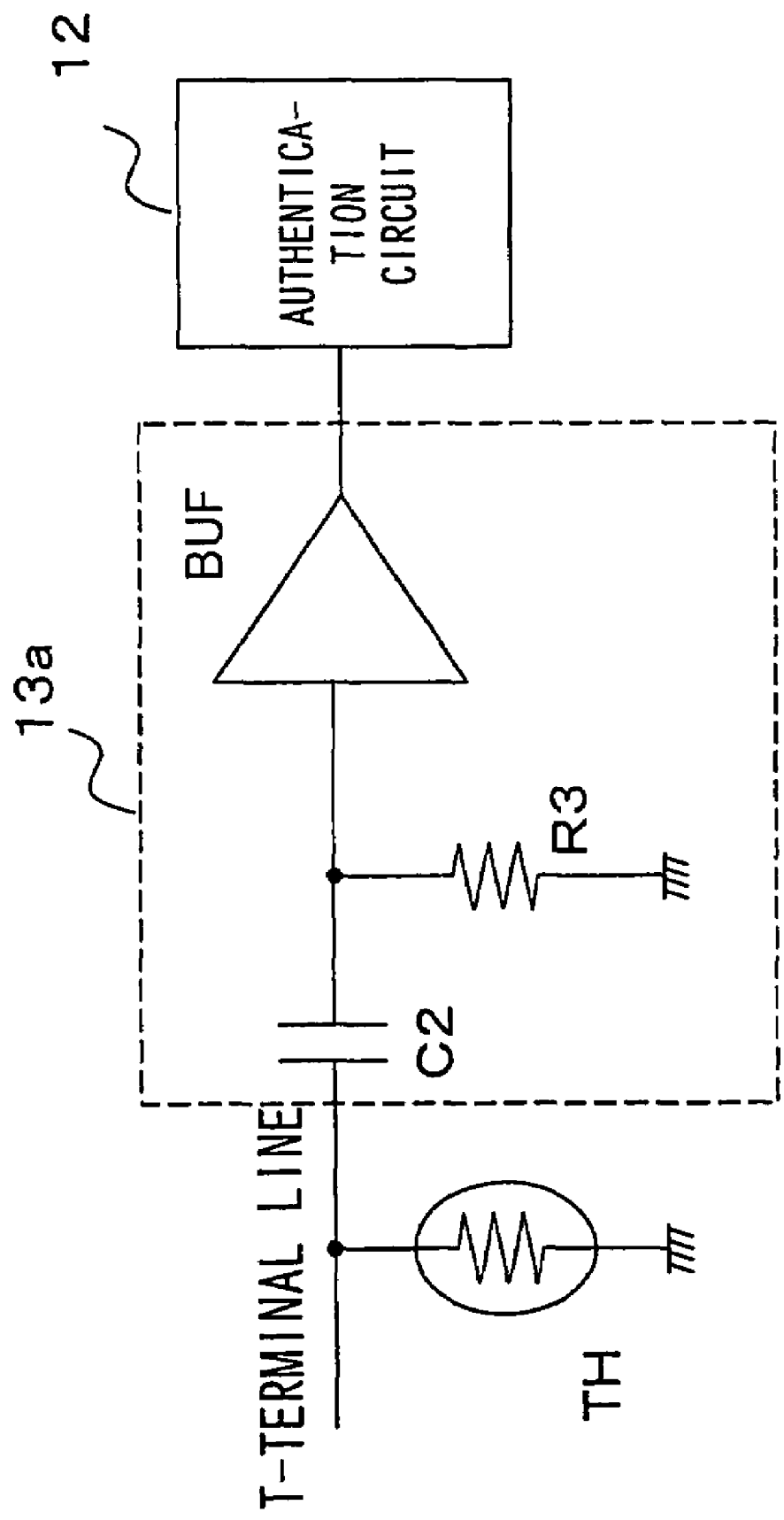
FIG. 5 is a block diagram showing other construction of a level-correction circuit of a first embodiment of the invention.

Next, the construction when not using a comparator CMP in the level-correction circuits 13, 23 will be explained. FIG. 5 is a block diagram showing other construction of a level-correction circuit of this first embodiment of the invention. The level-correction circuit 13a comprises: a resistor R3, capacitor C2 and buffer circuit BUF. The input terminal of the buffer circuit BUF is connected by way of the capacitor C2 to the T-terminal line to which the thermistor TH is also connected, and is connected to one end of the resistor R3. The other end of the resistor R3 is connected to ground. The output terminal of the buffer circuit BUF is connected to the authentication circuit 12. The input terminal of the buffer circuit BUF is connected to the T-terminal line by way of the capacitor C2, so unstable-region potential is not input when measuring the temperature. On the other hand, the signal overlapped with the signal for authentication is input by way of the capacitor C2 and amplified by the buffer circuit BUF, then output to the authentication circuit 12 as serial-logic data. In this case as well, the voltage output from the level-correction circuits is either near the power-supply potential or near the reference potential, and needless to say, unstable-region voltage is not output. Also, in this case, the direct current component is cut, so communication between authentication circuits is performed by generating an alternating current component using a square wave, and information is transmitted.

By using a level-correction circuit 13a constructed as described above, similar to as in the case of using the level-correction circuits 13, 23 explained previously, unstable-region voltage is no longer applied to the authentication circuits 12, 22, and malfunction of the authentication circuit is prevented.

Embodiment 2

Figure 6:
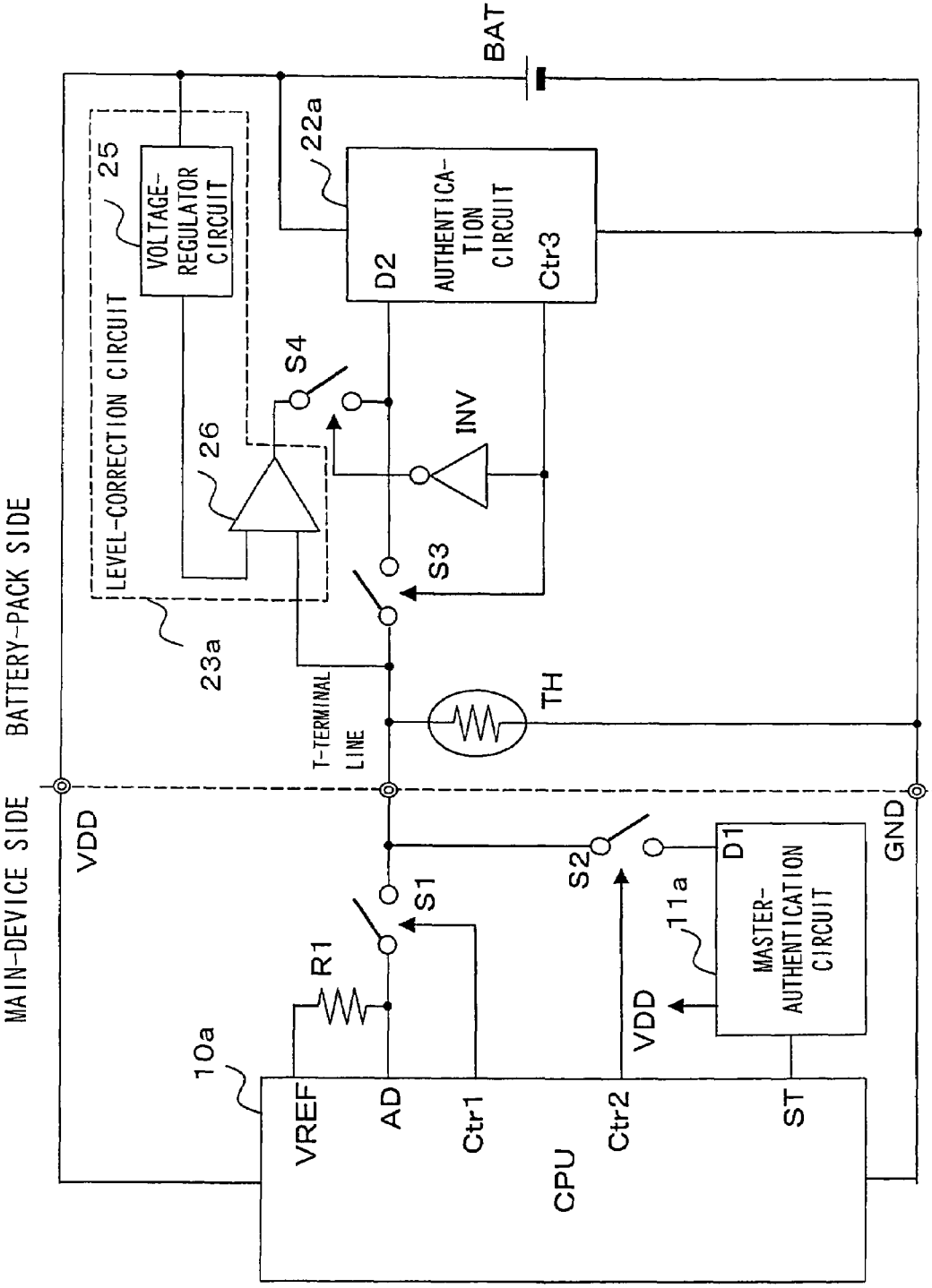
FIG. 6 is a block diagram showing the construction of a battery pack and portable electronic device of a second embodiment of the invention.
Figure 7:
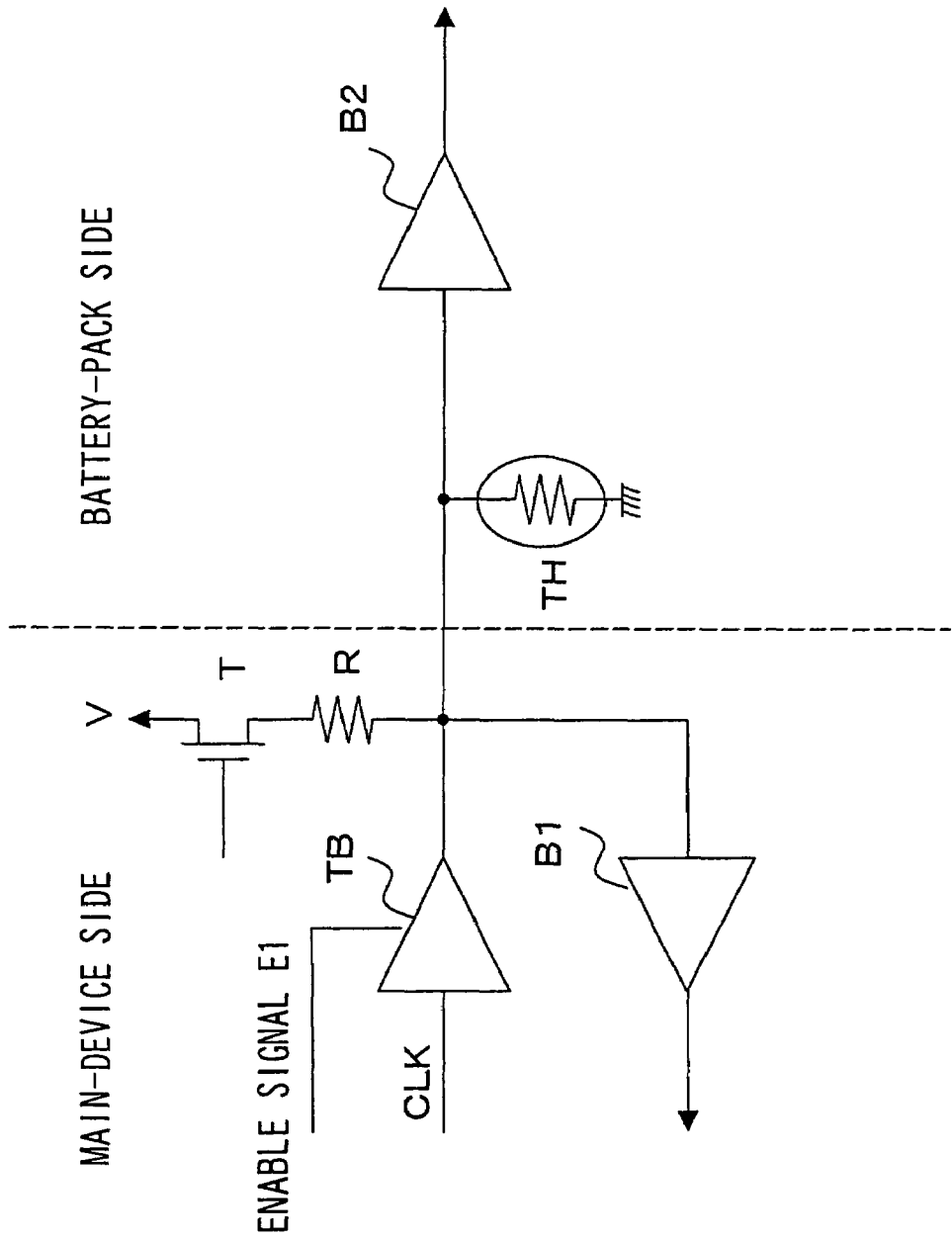
FIG. 7 is a block diagram showing the construction of a conventional device in which the transmission line for the temperature-detection sensor in the authentication circuit and the communication line for authentication data share the same line.

FIG. 6 is a block diagram showing the construction of the battery pack and portable electronic device of a second embodiment of the invention. In FIG. 6, the portable electronic device (main-device side) comprises: a CPU 10a, master-authentication circuit 11a, resistor R1 and switches S1, S2. On the other hand, the battery-pack side comprises: a authentication circuit 22a, thermistor TH, voltage-regulator circuit 25, comparator 26, inverter circuit INV and switches S3, S4. Here, the voltage-regulator circuit 25 and comparator 26 form a level-correction circuit 23a. The components forming the slave-authentication circuit on the battery side includes the authentication circuit 22a, voltage-regulator circuit 25, comparator 26, inverter circuit INV and switches S3, S4. Also, on the main-device side, similar to as in the first embodiment, there are various circuits and the like that allow the portable electronic device to function, however, since they are not related to this invention, an explanation thereof will be omitted. Also, on the battery-pack side there is a battery BAT, etc., and charging and power supply is performed between it and the main-device side, however, except for the battery BAT, the other components are not related to this invention, so an explanation thereof will be omitted.

In the portable electronic device (main-device side), the CPU 10a supplies voltage for temperature detection from the terminal VREF to the thermistor TH by way of the resistor R1 and switch S1. The contact point between the resistor R1 and switch S1 is connected to the terminal AD of the CPU 10a. The CPU 10a calculates the temperature of the thermistor TH by reading the voltage of the terminal AD when the switch S1 is closed. It has a built-in temperature-judgment function that controls the portable electronic device based on that calculation result.

Also, in order to authenticate the battery pack, the CPU 10a exchanges necessary data with the master-authentication circuit 11a by way of the terminal ST, and controls the portable electronic device according to the authentication result obtained from the master-authentication circuit 11a. The master-authentication circuit 11a has a authentication function, and the input/output terminal D1 of the master-authentication circuit 11a is connected to the T-terminal line when the switch S2 is closed, and exchanges data related to authentication with the battery-pack side. The switch S1 is controlled such that it is opened or closed according to output from the control terminal Ctr1 of the CPU 10a, and switch S2 is controlled such that it is opened or closed according to output from the control terminal Ctr2 of the CPU 10a.

On the battery-pack side, the authentication circuit 22a has a authentication function, and the input/output terminal D2 of the authentication circuit 22a is connected to the T-terminal line when the switch S3 is closed, and exchanges data that is related to authentication with the portable electronic device (main device side).

Also, on the battery-pack side, there is a thermistor TH for monitoring the temperature around the battery, where one end of the thermistor TH is connected to the T-terminal line, and the other end is connected to ground.

Furthermore, one input terminal of the comparator 26 is connected to the T-terminal line, and the other is connected to the battery BAT by way of the voltage-regulator circuit 25, and a specified potential that is different from the voltage of the thermistor TH terminal (unstable-region potential, etc.) is applied. Therefore, the potential that is output from the comparator 26 is a value near the power-supply potential or near the ground potential, and an unstable-region voltage is not output. Also, the output from the comparator 26 is connected to the input/output terminal D2 of the authentication circuit 22a by way of the switch S4. The switches S3, S4 are opened and closed by the output of the control terminal Ctr3 of the authentication circuit 22a and the inverter circuit INV that is connected to the control terminal Ctr3 so that that they operate opposite of each other.

In the construction described above, the switches are used to physically switch the connection line to the T-terminal line according to whether the voltage of the thermistor TH is being measured or authentication is being performed. When measuring the voltage of the thermistor TH, the switches S1, S4 are in a conductive state, and the switches S2, S3 are in an open state. The input of the comparator 26 is of high impedance, so only the resistance R1 and resistance component of the thermistor TH are seen on the T-terminal line, and when measuring the voltage of the thermistor TH terminal, the master-authentication circuit 11a and authentication circuit 22a are not affected. Also, since the comparator 26 that functions as a level-correction circuit is connected in the previous stage, unstable-region voltage of the T-terminal line is not applied to the serial-data-input terminal D2 of the authentication circuit 22a.

During authentication, the control terminal Ctr1 of the CPU 10a is used to open the switch S1, and the control terminal Ctr2 is used to put the switch S2 in a conductive state. At this time, as in the case of measuring the thermistor voltage, the switches S3, S4 are in the open and conductive states, respectively. In this state, the start-authentication pulse is sent from the master-authentication circuit 11a to the authentication circuit 22a. The authentication circuit 22a receives the start-authentication pulse signal by way of the comparator 26, and at the instant that authentication is complete, switches the switch S3 to the conductive state, and the switch S4 to the open state. The reason that the switch S3 is turned to conductive is to enable bi-directional communication, and the reason that the switch S4 is open is to prevent collision of data from the output from comparator 26 and from the output terminal D2 of the slave-authentication circuit. After authentication is finished, the switches return to the initial state, making it possible to measure the voltage of the thermistor TH.

Instead of the voltage-regulator circuit 25 and comparator 26, it is also possible to use level-correction circuits as shown in FIG. 5 and explained in the first embodiment. As mentioned above, in this case as well, it is possible to prevent application of unstable-region voltage to the authentication circuit. In this case, the direct current component is cut, so communication between authentication circuits is performed by generating an alternating current component using a square wave, and information is transmitted.

With the construction of FIG. 6, the connection to the signal line is physically changed over using the switches, so it is not necessary to output an overlap pulse for authentication as explained for the first embodiment. Therefore, control of the main-device side becomes easier.

The present invention can be applied to the authentication of a battery pack that is mounted in a portable electronic device such as a digital video camera, digital still camera, portable telephone, printer etc.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A data-authentication circuit comprising:
an input/output terminal on a battery-pack-device side;
a temperature sensor of which one terminal is connected to said input/output terminal and the other terminal is connected to a reference power supply;
a level-correction circuit on the battery-pack-device side whose input end is connected to said input/output terminal, and whose output end is connected to the input end of an authentication circuit on the battery-pack-device side; and
said authentication circuit that outputs a signal related to authentication to said input/output terminal; wherein
said level-correction circuit corrects a voltage applied to said input/output terminal so as to make the voltage greater than or less than an unstable-region voltage, and outputs a resultant voltage to said authentication circuit.

2. The data-authentication circuit of claim 1 wherein said level-correction circuit has a function for correcting the voltage applied to said input/output to high level or low level and outputting it to said authentication circuit.

3. The data-authentication circuit of claim 1 wherein said level-correction circuit comprises a voltage-comparator circuit that compares a first voltage that is input to its input end with a second voltage that is obtained by way of an integrator circuit that integrates said first voltage, and outputs the output from said voltage-regulator circuit to said level-correction circuit.

4. The data-authentication circuit of claim 1 wherein
said level-correction circuit comprises a voltage-comparator circuit that compares a first voltage that is input to its input end, with a second voltage that differs from said first voltage; wherein
said second voltage supplies a specified voltage from a voltage-regulator circuit, and
an output from said voltage-comparator circuit provides an output from said level-correction circuit.

5. The data-authentication circuit of claim 1 wherein said level-correction circuit comprises a buffer circuit the cuts the direct-current portion of a first voltage that is input to its input end, and where an output from said buffer circuit provides an output of said level-correction circuit.

6. A battery pack comprising the data-authentication circuit of claim 1.

7. A battery pack comprising: the data-authentication circuit of claim 1, a first switch between the output end of said level-correction circuit and the input end of said authentication circuit, and a second switch between said input/output terminal and the output end of said authentication circuit; where said first switch and said second switch open and close opposite of each other in correspondence to the battery pack start-authentication signal.

8. A portable electronic device that is connected to the data-authentication circuit of claim 1, and that performs an authentication operation and comprising:
an input/output terminal on the main-device side that is connected to said input/output terminal of said data-authentication circuit or said battery pack, and a master-data-authentication circuit; wherein
said master-data-authentication circuit comprises a level-correction circuit on a main-device side, and an authentication circuit on the main-device side; and
said level-correction circuit on the main-device side whose input end is connected to the input/output terminal on said main-device side, and whose output end is connected to the input end of the authentication circuit on the main-device side, corrects the voltage applied to the input/output terminal on the main-device side such that it is greater than or less than an unstable-region voltage and outputs it to the authentication circuit on the main-device side.

9. The portable electronic device of claim 8 wherein said level-correction circuit on the main-device side has a function for correcting the voltage applied to the said input/output terminal on the main-device side such that it is high level or low level, and outputting it to said authentication circuit on the main-device side.

10. A portable electronic device that is connected to the battery pack of claim 6, and that performs an authentication operation, said device comprising:
an input/output terminal on the main-device side that is connected to said input/output terminal of said data-authentication circuit or said battery pack, and a master-data-authentication circuit; wherein said master-data-authentication circuit comprises a level-correction circuit on a main-device side, and an authentication circuit on the main-device side; and said level-correction circuit on the main-device side whose input end is connected to the input/output terminal on said main-device side, and whose output end is connected to the input end of the authentication circuit on the main-device side, corrects the voltage applied to the input/output terminal on the main-device side such that it is greater than or less than an unstable-region voltage and outputs it to the authentication circuit on the main-device side.

11. The portable electronic device of claim 10 wherein said level-correction circuit on the main-device side has a function for correcting the voltage applied to the said input/output terminal on the main-device side such that it is high level or low level, and outputting it to said authentication circuit on the main-device side.

12. A data-authentication circuit comprising:
an input/output terminal;
an authentication circuit that outputs a signal related to authentication to said input/output terminal; and
a level-correction circuit whose input end is connected to said input/output terminal, and whose output end is connected to the input end of said authentication circuit; wherein,
said level-correction circuit corrects a voltage applied to said input/output terminal so as to make the voltage greater than or less than an unstable-region voltage, and outputs a resultant voltage to said authentication circuit.

13. The data-authentication circuit of claim 12 wherein,
said level-correction circuit has a function for correcting the voltage applied to said input/output terminal to high level or low level and outputting it to said authentication circuit.

14. The data-authentication circuit of claim 12 wherein,
said level-correction circuit comprises a voltage-comparator circuit that compares a first voltage that is input to its input end with a second voltage that is obtained by way of an integrator circuit that integrates said first voltage, and outputs an output from said voltage-comparator circuit as an output of said level-correction circuit.

15. The data-authentication circuit of claim 12, wherein,
said level-correction circuit comprises a voltage-comparator circuit that compares a first voltage that is input to its input end with a second voltage that is supplied from a voltage-regulator circuit, and outputs an output from said voltage-comparator circuit as an output of said level-correction circuit.

16. The data-authentication circuit of claim 12 wherein,
said level-correction circuit comprises a buffer circuit that cuts off a direct-current portion of a first voltage that is input to its input end, and outputs an output from said buffer circuit as Sri output of said level-correction circuit.

17. A battery pack comprising:
the data-authentication circuit of claim 12; and
a temperature sensor of which one terminal is connected to said input/output terminal and the other terminal is connected to a reference power supply.

18. The battery pack of claim 17 comprising:
a first switch that is disposed between the output end of said level-correction circuit and the input end of said authentication circuit; and
a second switch that is disposed between said input/output terminal and the output end of said authentication circuit; wherein
said first switch and said second switch open and close opposing each other in correspondence to a battery pack start-authentication signal.

19. A portable electronic device that is connected to the battery pack of claim 17, and that performs authentication operation and comprising:
a supply circuit that supplies said unstable-region voltage to the one terminal of said temperature sensor to operate the temperature sensor;
an input/output terminal on the main-device side;
a master-data-authentication circuit that outputs a signal related to authentication to said input/output terminal on the main-device side; and
a level-correction circuit on the main-device side whose input end is connected to said input/output terminal on the main-device side, and whose output end is connected to the input end of said authentication circuit on the main-device side, said level-correction circuit on the main-device side further comprising:
a data-authentication circuit on the main-device side that corrects a voltage applied to said input/output terminal on the main-device side so as to make the voltage greater than or less than said unstable-region voltage, and outputs a resultant voltage to said authentication circuit on the main-device side, wherein
the input/output terminal of said battery pack the output of said supply circuit and the input/output terminal of said authentication circuit on the main-device side are connected in common.

20. A portable electronic device that is connected to the battery pack of claim 18, and that performs authentication operation and comprising:
a supply circuit that supplies said unstable-region voltage to the one terminal of said temperature sensor to operate the temperature sensor;
an input/output terminal on the main-device side;
a level-correction circuit on the main-device side whose input end is connected to said input/output terminal on the main-device side, and whose output end is connected to the input end of said authentication circuit on the main-device side, said level-correction circuit on the main-device side further comprising:
a data-authentication circuit on the main-device side that corrects a voltage applied to said input/output terminal on the main-device side so as to make the voltage greater than or less than said unstable-region voltage, and outputs a resultant voltage to said authentication circuit on the main-device side, wherein
the input/output terminal of said battery pack, the output of said supply circuit and the input/output terminal of said authentication circuit on the main-device side are connected in common.

* * * * *